United States Patent [19]

Nagasawa et al.

[11] Patent Number: 5,233,484
[45] Date of Patent: Aug. 3, 1993

[54] AUDIO SIGNAL REPRODUCING APPARATUS

[75] Inventors: Kenichi Nagasawa; Taizou Hori, both of Kanagawa; Shinichi Hatae, Tokyo, all of Japan

[73] Assignee: Canon Kabushiki Kaisha, Tokyo, Japan

[21] Appl. No.: 884,809

[22] Filed: May 19, 1992

Related U.S. Application Data

[63] Continuation of Ser. No. 561,677, Aug. 1, 1990, Pat. No. 5,142,419.

[30] Foreign Application Priority Data

| Aug. 4, 1989 | [JP] | Japan | 1-203056 |
| Aug. 4, 1989 | [JP] | Japan | 1-203057 |
| Aug. 22, 1989 | [JP] | Japan | 1-216694 |

[51] Int. Cl.$^5$ ............................................. G11B 5/62
[52] U.S. Cl. .......................................... 360/64; 360/27
[58] Field of Search ................. 360/27, 28, 29, 30, 360/64, 51

[56] References Cited

U.S. PATENT DOCUMENTS 4,786,986 11/1986 Yamanushi et al. ................. 360/27

*Primary Examiner*—Vincent P. Canney
*Attorney, Agent, or Firm*—Robin, Blecker, Daley & Driscoll

[57] ABSTRACT

An apparatus for reproducing from a recording medium a frequency-modulated audio signal which has its carrier level in a specific period determined according to the kind of information and for producing the audio signal after processing the reproduced audio signal is arranged to control the signal processing action according to the output of a detecting circuit which detects the level of a difference between the carrier level of the frequency-modulated audio signal obtained in the specific period and the carrier level obtained in a period other than the specific period or detects changes taking place in the carrier level. This arrangement enables the apparatus to process the audio signal appositely to the kind of the frequency-modulated signal thereof without recourse to any additional reproducing circuit solely for this purpose. Further, the apparatus is arranged to prevent any faulty signal processing action by nullifying as necessary the output of the detecting circuit.

7 Claims, 8 Drawing Sheets

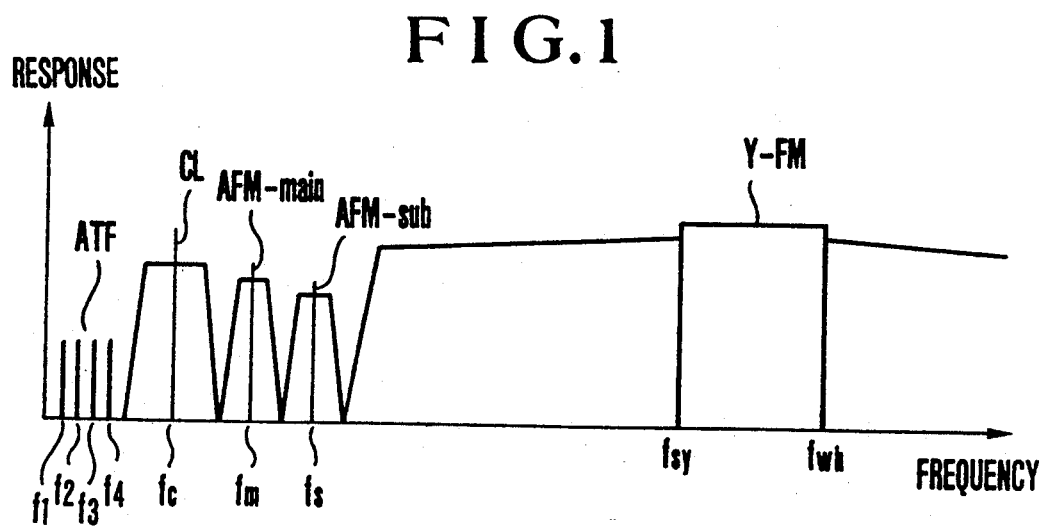
FIG.1
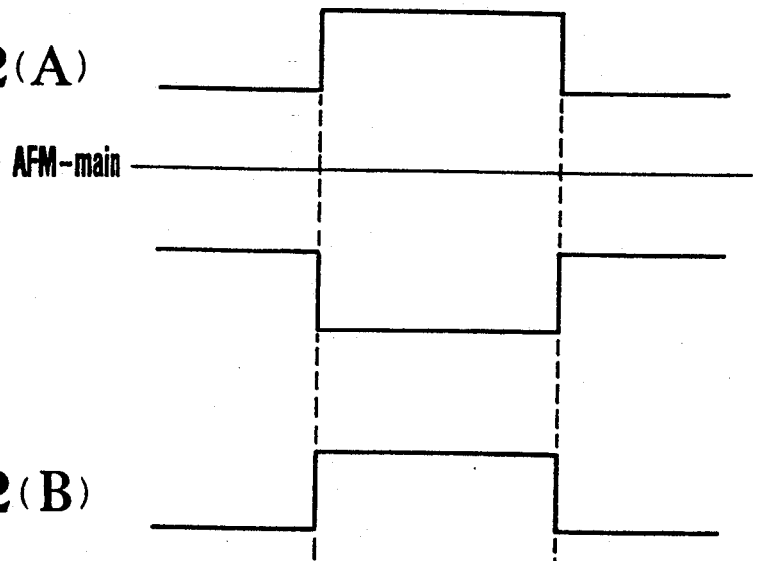
FIG.2(A)
FIG.2(B)
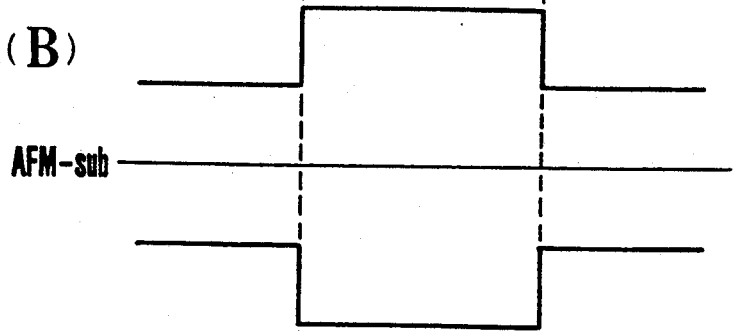
FIG.2(C)

AUDIO SIGNAL REPRODUCING APPARATUS

This application is a continuation of application Ser. No. 561,677, filed Aug. 1, 1990 now U.S. Pat. No. 5,142,419.

BACKGROUND OF THE INVENTION

1. Field of the Invention

This invention relates to an audio signal reproducing apparatus and more particularly to an apparatus for reproducing a recorded signal from a recording medium on which some of audio signals of a plurality of kinds are recorded.

2. Description of the Related Art

The video tape recorder (VTR) of the camera-integrated type has recently come to be arranged to record and reproduce sounds in a stereophonic state. Even the VTR of the conventional kind, recording a monaural audio signal by frequency-modulating it with a carrier wave of 1.5 MHz, has come to be arranged to record, with the frequency modulation carrier wave of 1.5 MHz, a sum signal obtained from L (left) and R (right) channels and further to record a difference signal between the L and R channel signals by newly providing a frequency modulation carrier wave of 1.7 MHz.

In cases where different audio signals are to be recorded separately in the L and R channels (for example, the Japanese language in the L channel and the English language in the R channel) as main-and-sub audio signals, the VTR which is arranged to record the stereophonic audio signals by the above-stated sum/difference signal recording method is required to find whether recorded signals are stereophonic audio signals or main-and-sub audio signals and to switch its signal processing mode from one mode over to another by determining whether or not these signals should be allowed to pass through a matrix circuit.

It is, however, troublesome to manually perform the above-stated switch-over of processes. Besides, erroneous switch-over would greatly degrade the quality of reproduced sounds. To avoid the error, therefore, it has been desired to automatically switch one processing mode over to another. For this purpose, identification data which indicates the kinds of the audio signals must be somehow recorded on the recording medium and the above-stated switch-over must be performed according to the identification data.

Generally, however, a real-time analog audio signal does not include any surplus part. It has been, therefore, difficult to add such identification data to the audio signal. Further, it hinders high density recording to record and reproduce the identification data in addition to the audio signal. Besides, it requires use of discrete recording/reproducing means.

To solve this problem, it is conceivable to multiplex the identification data and the audio signal together. However, since the audio signal does not have any surplus part, the multiplexed identification data tends to be erroneously detected. Such erroneous detection would cause a large noise in the reproduced audio signal.

SUMMARY OF THE INVENTION

It is a general object of this invention to solve the above-stated problems of the prior art.

It is a more specific object of the invention to provide an audio signal reproducing apparatus which is capable of accurately detecting the kind of a reproduced audio signal and processing it accordingly even in cases where no identification data indicating the kind of the audio signal is discretely recorded.

Under this object, an audio signal reproducing apparatus arranged as an embodiment of this invention to reproduce, from a recording medium, a frequency-modulated audio signal a portion of which in a specific period has a carrier level determined according to the kind of information comprises: reproducing means for reproducing the frequency-modulated audio signal from the recording medium; signal processing means arranged to process the frequency-modulated audio signal reproduced by the reproducing means and to output the audio signal; detecting means for detecting the level of a difference between the carrier level of the portion of the frequency-modulated audio signal in the specific period and a carrier level of a portion the frequency-modulated audio signal in a period other than the specific period; and control means for controlling a processing operation of the signal processing means according to an output of the detecting means.

It is another object of the invention to provide an audio signal reproducing apparatus which is capable of preventing occurrence of a noise caused by erroneous detection of identification data in cases where the identification data indicating the kind of an audio signal is multiplexed along with the audio signal.

Under the above-stated object, an audio signal reproducing apparatus arranged according to this invention to reproduce, from a recording medium, a first audio signal which is either a sum signal indicating the sum of stereophonic audio signals or a main audio signal of main-and-sub audio signals and a second audio signal which is either a difference signal indicating a difference between the stereophonic audio signals or a subsidiary audio signal of the main-and-sub audio signals comprises: reproducing means for reproducing the first and second audio signals; first discriminating means for discriminating, on the basis of information multiplexed with the first audio signal, whether the first and second audio signals belong to the stereophonic audio signals or to the main-and-sub audio signals; second discriminating means for discriminating, on the basis of information multiplexed with the second audio signal, whether the first and second audio signals belong to the stereophonic audio signals or to the main-and-sub audio signals; and signal processing means arranged to process the first and second audio signals in accordance with outputs of the first and second discriminating means and to selectively output the stereophonic audio signals or the main-and-sub audio signals, said signal processing means being arranged to output only the first audio signal when the outputs of said first and second discriminating means contradict each other.

The above and further objects and features of the invention will become apparent from the following detailed description of embodiments thereof taken in conjunction with the accompanying drawings.

BRIEF DESCRIPTION OF THE DRAWINGS

FIG. 1 shows the frequency spectra of recorded signals.

FIGS. 2(A), 2(B) and 2(C) show the carrier levels of frequency-modulated audio signals as recorded.

DETAILED DESCRIPTION OF PREFERRED EMBODIMENTS

The following describes a VTR arranged according to this invention as an embodiment thereof: The VTR is arranged to frequency-modulate and record either sum and difference signals of the left and right channel stereo audio signals or main-and-sub audio signals as the audio signals of two channels.

The frequency-modulated audio signal (hereinafter referred to as an AFM signal) is magnetically recorded and reproduced as frequency-modulated audio signal which is obtained by a frequency-modulating an audio signal. The frequency spectrum of the AFM signal is shown in FIG. 1. In FIG. 1, reference symbols f1 to f4 denote the frequencies of pilot signals ATF which are provided for tracking control in accordance with a known 4-frequency method. A symbol fc denotes the carrier frequency of a low-band converted chrominance signal CL. Symbols fm and fs denote respectively the carrier frequency of a main AFM signal AFM-main and that of a subsidiary AFM signal AFM-sub. In the mode of stereo audio signal recording, the main AFM signal AFM-main is recorded as the sum signal of the signals of the L (left) and R (right) channels. In the mode of main-and-sub audio signal recording, the Japanese language is, for example, recorded as the main AFM signal.

Meanwhile, the subsidiary AFM signal AFM-sub is recorded as a difference signal between the signals of the L and R channels in the stereo audio signal recording mode. In the main-and-sub audio signal recording mode, the English language is, for example, recorded as the subsidiary audio signal. Further, in cases where no subsidiary AFM signal is recorded, the main AFM signal is recorded as a monaural audio signal.

A reference symbol fsy denotes the frequency of the sync tip part of a luminance signal. A symbol fwh denotes the frequency of the white peak part of the luminance signal. The allocation of these frequencies varies, as well known, according to the format of the so-called high-band recording made and that of the normal recording mode.

FIGS. 2(A) and 2(B) show the amplitude of the carrier wave of the main AFM signal AFM-main and that of the subsidiary AFM signal AFM-sub, respectively, in the main-and-sub audio signal recording mode. As shown in FIGS. 2(A) and 2(B), the amplitude level of the carrier wave of the AFM signal obtained in the vertical blanking period of the luminance signal shown in FIG. 2(C) is greater than that obtained in a period other than the vertical blanking period.

Figure 3:
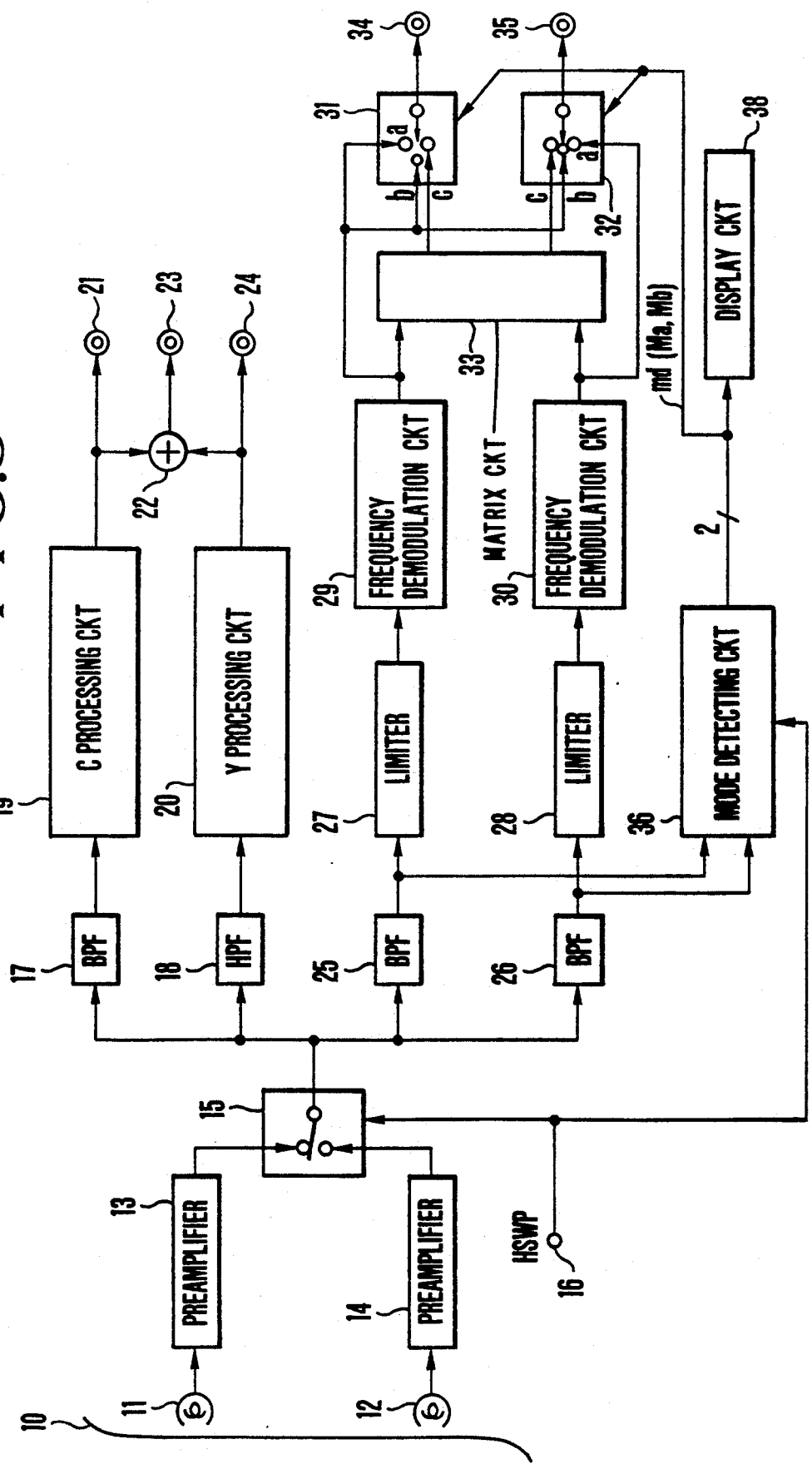
FIG. 3 is a block diagram showing in outline the arrangement of the reproducing system of a VTR arranged according to this invention as an embodiment thereof.

FIG. 3 shows in outline the arrangement of the reproducing system of a VTR which is arranged according to this invention as an embodiment thereof. Referring to FIG. 3, signals recorded on a magnetic tape 10 are reproduced through rotary heads 11 and 12 and preamplifiers 13 and 14. These signals are then separated by a switch circuit 15 which is arranged to have its switching position changed by a head switching pulse signal (HSWP) which is supplied from a terminal 16 in synchronism with the rotation phases of the heads 11 and 12. After that, the signal output from the switch circuit 15 is supplied to a band-pass filter (BPF) 17, a high-pass filter (HpF) 18, a BPF 25 and a BPF 26.

The BPF 17 separates a low-band chrominance signal. The low-band chrominance signal is supplied to a chrominance signal (C) processing circuit 19 to be brought back to its original frequency band through a frequency converting process, etc. The chrominance signal which is processed by the circuit 19 is supplied to a chrominance signal output terminal 21 to be output therefrom and is also supplied to a mixing circuit 22.

The HPF 18 separates a frequency-modulated luminance signal. The luminance signal is supplied to a luminance signal (Y) processing circuit 20 to be subjected to a frequency demodulating process, etc. The luminance signal thus processed is supplied to a luminance signal output terminal 24 to be output therefrom and is, at the same time, supplied to the mixing circuit 22. Then, the mixing circuit 22 produces a composite video signal. The video signal is supplied to an output terminal 23 to be output therefrom.

The BPF 25 separates the main AFM signal, which is supplied to a mode detecting circuit 36 and a limiter 27. The main AFM signal processed by the limiter 27 is supplied to a frequency demodulation circuit 29 to be demodulated into an original audio signal. The demodulated signal is supplied to a stereo matrix circuit 33, to the terminal "a" of a switch 31 and also to the terminals b of the switch 31 and a switch 32 respectively.

The BPF 26 is arranged to separate the subsidiary AFM signal. The subsidiary AFM signal is supplied also to the mode detecting circuit 36 and to a limiter 28. The signal processed by the limiter 28 is supplied to a frequency demodulation circuit 30 to be demodulated back to an original audio signal. The demodulated subsidiary audio signal is supplied to the matrix circuit 33 and to the terminal "a" of the switch 32 respectively.

In a case where the recorded audio signals are found to be stereophonic audio signals by a two-bit mode detection signal "md" which is output from the mode detecting circuit 36 as will be described later, the switches 31 and 32 cause the demodulated stereophonic audio signals output from the matrix circuit 33 to be supplied to output terminals 34 and 35 through the terminals "c" of the switches 31 and 32 respectively. In a case where the audio signals are found to be recorded in the main-and-sub audio signal mode, the frequency-demodulated audio signals output from the frequency demodulation circuits 29 and 30 are supplied to the output terminals 34 and 35 via the terminals "a" of the switches 31 and 32 without being supplied to the matrix circuit 33. Either the stereophonic audio signals or the main-and-sub audio signals thus can be selectively output as applicable. Further, in a case where no subsidiary AFM signal is recorded, both the switches 31 and 32 are connected to their terminals "b". In that case, a monaural audio signal obtained by frequency-demodulating the main AFM signal is output from the terminals 34 and 35 as will be described later.

Figure 4:
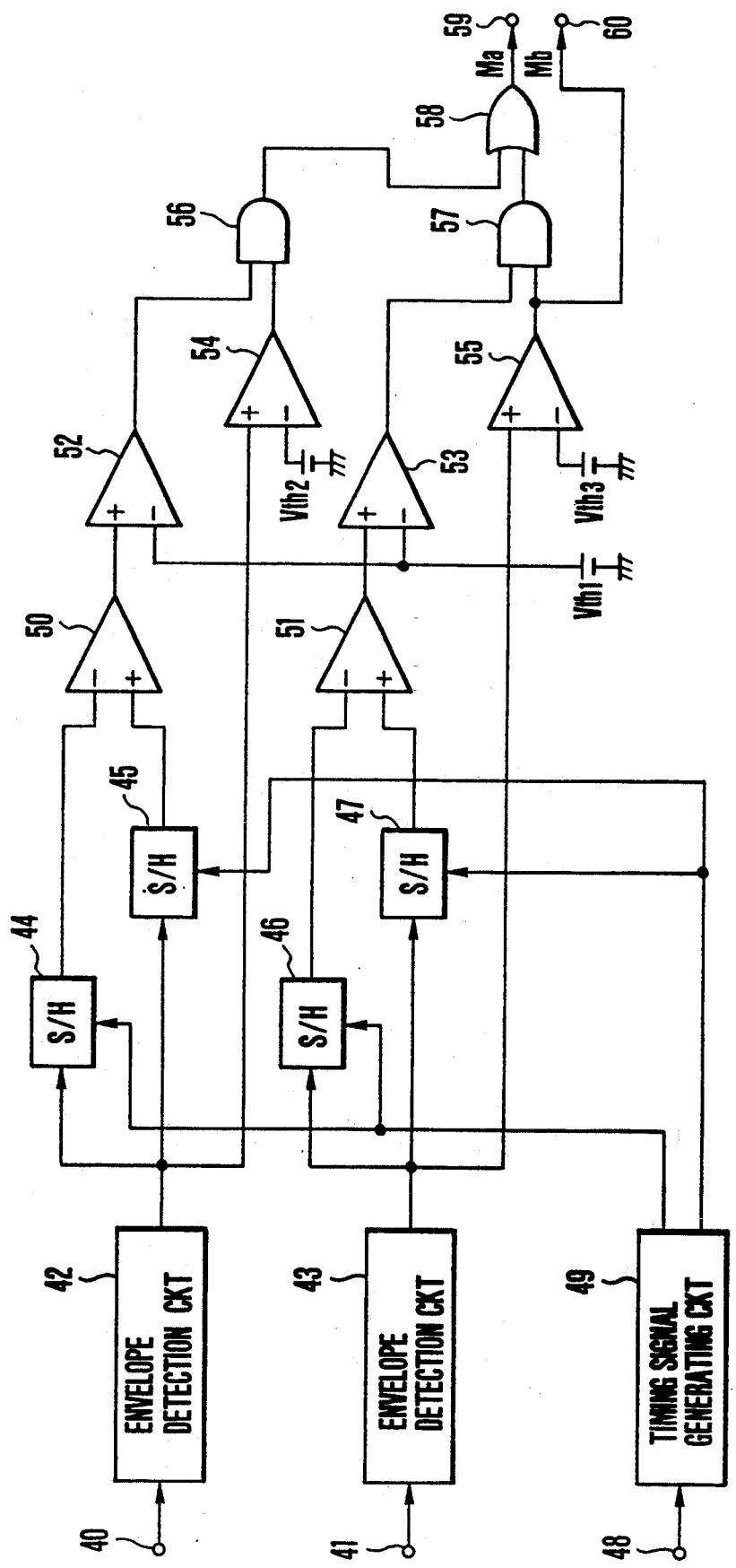
FIG. 4 is a block diagram showing by way of example the arrangement of a mode detecting circuit included in the VTR of FIG. 3.

The details of arrangement of the mode detecting circuit 36 of FIG. 3 are as described below:

FIG. 4 shows by way of example the details of the mode detecting circuit 36. Referring to FIG. 4, terminals 40 and 41 are arranged to receive the AFM signals separated by the BPFs 25 and 26 respectively. These AFM signals are respectively supplied to envelope detection circuits 42 and 43. The envelope detection circuits 42 and 43 are arranged to detect the levels of the carrier waves of these AFM signals. The output of the envelope detection circuit 42 is supplied to sample-and-hold (S/H) circuits 44 and 45 and also to a comparator 54. The output of the other envelope detection circuit 43 is supplied to S/H circuits 46 and 47 and a comparator 55.

The S/H (sample-and-hold) circuits 44 and 46 are arranged to sample and hold the carrier levels of the AFM signals obtained immediately before a vertical blanking period respectively. Sampling pulse signals for this purpose are formed by a timing signal generating circuit 49 in synchronism with a signal HSWP coming from a terminal 48. Meanwhile, the S/H circuits 45 and 47 are arranged to sample and hold the carrier wave levels of the AFM signals obtained in a vertical blanking period respectively. Sampling pulse signals for the S/H circuits 45 and 47 are also likewise obtained by and supplied from the timing signal generating circuit 49.

Each of differential amplifiers 50 and 51 is arranged to produce a signal indicating the level of a difference between the output of the S/H circuit 45 or 47 and that of the S/H circuit 44 or 46. In other words, the level of a difference between the carrier level of the AFM signal obtained in a vertical blanking period and that of the AFM signal obtained in a period other than the vertical blanking period is obtained. The difference level signals thus output from the differential amplifiers 50 and 51 are supplied respectively to comparators 52 and 53 to be compared with a given threshold level Vth1. If these difference levels are found to be higher than the threshold level Vth1, each of the comparators 52 and 53 produces a logical high level signal (Hi). In other words, the output levels of the comparators 52 and 53 become high in a case where the main-and-sub audio signals are recorded.

Meanwhile, the outputs of the envelope detection circuits 42 and 43 are supplied also to other comparators 54 and 55. These comparators 54 and 55 then find whether the carrier levels of the AFM signals are higher than given threshold levels Vth2 and Vth3, respectively. If the carrier levels are higher than the threshold levels respectively, i.e., if the carrier levels of the AFM signals are sufficiently high, the output levels of the comparators 54 and 55 become high.

The outputs of the comparators 52 and 54 are supplied to an AND gate 56. The outputs of the comparators 53 and 55 are supplied to another AND gate 57. The AND gates 56 and 57 are arranged to nullify, if the carrier levels are low, the information from the comparators 52 and 53 which indicates that the main-and-sub audio signals are recorded as mentioned above, because: The information is considered to be unreliable in the event of low carrier levels. In cases where at least one of the AND gates 56 and 57 produces a high level output, the output of an OR gate 58 is produced at a high level. In this instance, the mode detecting circuit 36 judges that the main-and-sub audio signals are recorded. Then, the output of the OR gate 58 is supplied to a terminal 59 as mode information Ma.

The output of the comparator 55 indicates the presence or absence of the subsidiary AFM signal. Therefore, if the output of this comparator 55 is at a logical low level (Lo), it is difficult to restore the audio signals of two channels. In that instance, the output of this comparator 55 is supplied as mode information Mb to a terminal 60. In this manner, the mode detecting circuit 36 is arranged to produce the mode information signals Ma and Mb in the form of two-bit data respectively. In a case where the mode information signal Mb is at a low level, the switches 31 and 32 are connected to their terminals "b" independent of the mode information signal Ma. Then, the audio signal output from the frequency demodulation circuit 29, i.e., the sum signal of the stereophonic audio signals or the main audio signal, is supplied as a monaural audio signal to output terminals 34 and 35.

If the mode information signal Mb is at a high level, the audio signals of two channels can be produced. In that case, the switches 31 and 32 are connected to their terminals "a" when the mode information signal Ma is at a high level. Then, the main-and-sub audio signals output from the frequency demodulation circuits 29 and 30 are supplied to the output terminals 34 and 35. Further, in a case where the mode information signal Mb is at a high level while the mode information signal Ma is at a low level, the switches 31 and 32 are connected to their terminals "c". As a result, the stereophonic audio signals of the left and right channels which are output from the matrix circuit 33 are supplied to the output terminals 34 and 35.

In this instance, a display part 38 makes a display according to the mode information signals Ma and Mb indicating whether the audio signals are output in the stereophonic audio signal mode or the monaural audio signal mode or in the main-and-sub audio signal mode.

With the embodiment arranged as described above, whether or not the main-and-sub audio signals are recorded is detectable by finding the level of a difference between the carrier level of the AFM signal obtained in a vertical blanking period and that of the AFM signal obtained in a period other than the vertical blanking period by means of each of the differential amplifiers 50 and 51. Therefore, the discriminating action can be accurately accomplished without being affected by fluctuations of the reproducing efficiency of the heads 11 and 13 or by the condition of tracking. Further, this arrangement obviates the necessity of setting the carrier level in such a way as to have a great difference between the vertical blanking period and other periods. This enables the carrier level of the audio signal in the vertical blanking period to be set at a level close to the carrier level set at an ideal level in other periods. Therefore, the audio signals can be reproduced without deteriorating them at all.

Figure 5:
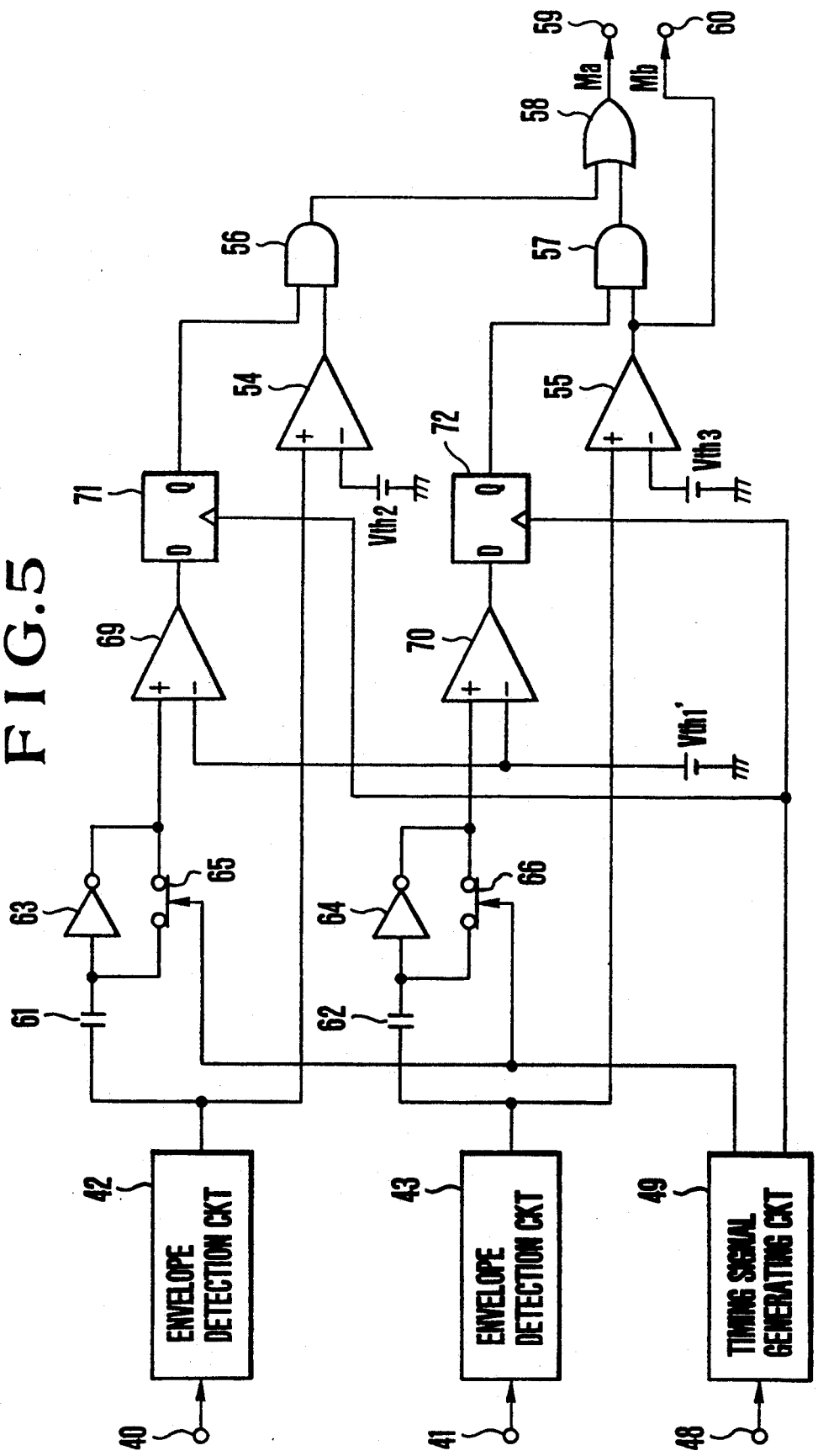
FIG. 5 is a block diagram showing another example of arrangement of the mode detecting circuit of the VTR of FIG. 3.

FIG. 5 shows another example of arrangement of the mode detecting circuit 36 of FIG. 3. In FIG. 5, the same parts as those of FIG. 4 are indicated by the same reference numerals and the details of them are omitted from the following description. Referring to FIG. 5, a signal output from each of the envelope detection circuits 42 and 43 is supplied to one end of a capacitor 61 or 62. The other ends of the capacitors 61 and 62 are connected to inverting amplifiers 63 and 64. The output and input sides of each of the inverting amplifiers 63 and 64 are arranged to be short-circuited by turning on a switch 65 or 66. The timing signal generating circuit 49 is arranged to generate a timing pulse signal for turning on these switches 65 and 66 during a vertical blanking period. The input and output sides of the inverting amplifiers 63 and 64 are thus short-circuited according to the timing pulse signal. In this instance, the input and output levels of the inverting amplifiers 63 and 64 are fixed to zero level. Then, the carrier levels of the AFM signals obtained in the vertical blanking period are held at the capacitors 61 and 62.

When the switches 65 and 66 are opened after this, each of the capacitors 61 and 62 supplies to the inverting amplifier 63 or 64 with a signal indicating a negative level which is obtained by subtracting the above-stated held level from the current carrier level of the AFM signal. As a result, each of the inverting amplifiers 63 and 64 produces a signal indicating a positive level which corresponds to the level of a difference between the carrier level of the AFM signal obtained in the vertical blanking period and the carrier level of the AFM signal as currently reproduced. The signals indicating these difference levels are supplied to comparators 69 and 70. The comparators 60 and 70 are arranged to compare the output levels of the inverting amplifiers 63 and 64 with a given threshold level value Vth1'. The results of comparison are output in the form of logical binary signals. The binary signals are supplied to the D terminals of D type flip-flops 71 and 72. The clock terminals of these D type flip-flops 71 and 72 are arranged to receive, in a period other than the vertical blanking period, a timing pulse signal which is supplied in synchronism with a signal HSWP. The flip-flops 71 and 72 thus hold the logical binary signals for every vertical blanking period to output them. The outputs of the D type flip-flops 71 and 72 are similar to those of the comparators 52 and 53 of FIG. 4. After that, processes are carried out in the same manner as in the case of FIG. 4 to obtain the mode information signals Ma and Mb.

Like in the case of the mode detecting circuit of FIG. 4, this example is arranged to detect the main-and-sub audio signal recording mode according to a difference in the carrier levels of the AFM signals between the vertical blanking period and the other period. The arrangement, therefore, gives the same advantageous effect as the mode detecting circuit of FIG. 4.

The detecting circuits 36 of FIGS. 3, 4 and 5 are arranged to find whether the audio signals of two channels are recorded in the main-and-sub audio signal recording mode or in the stereophonic audio signal recording mode by detecting the changes of the level of the carrier wave. However, this arrangement may be changed to detect the kind of the frequency-modulated audio signal of one channel, for example, by making a discrimination between a music record and a non-music record or between the presence and absence of a record showing a noise low-band processing action by means of the detecting circuit arranged as shown in FIG. 4 or 5. The reproducing processes then can be determined according to the result of detection.

As described above, the audio signal reproducing apparatus arranged as shown in FIGS. 3, 4 and 5 is capable of accurately detecting the kind of the recorded audio signals and carrying out reproducing processes according to the result of detection even in cases where no identifying information on the kind of signal is discretely recorded.

Figure 6:
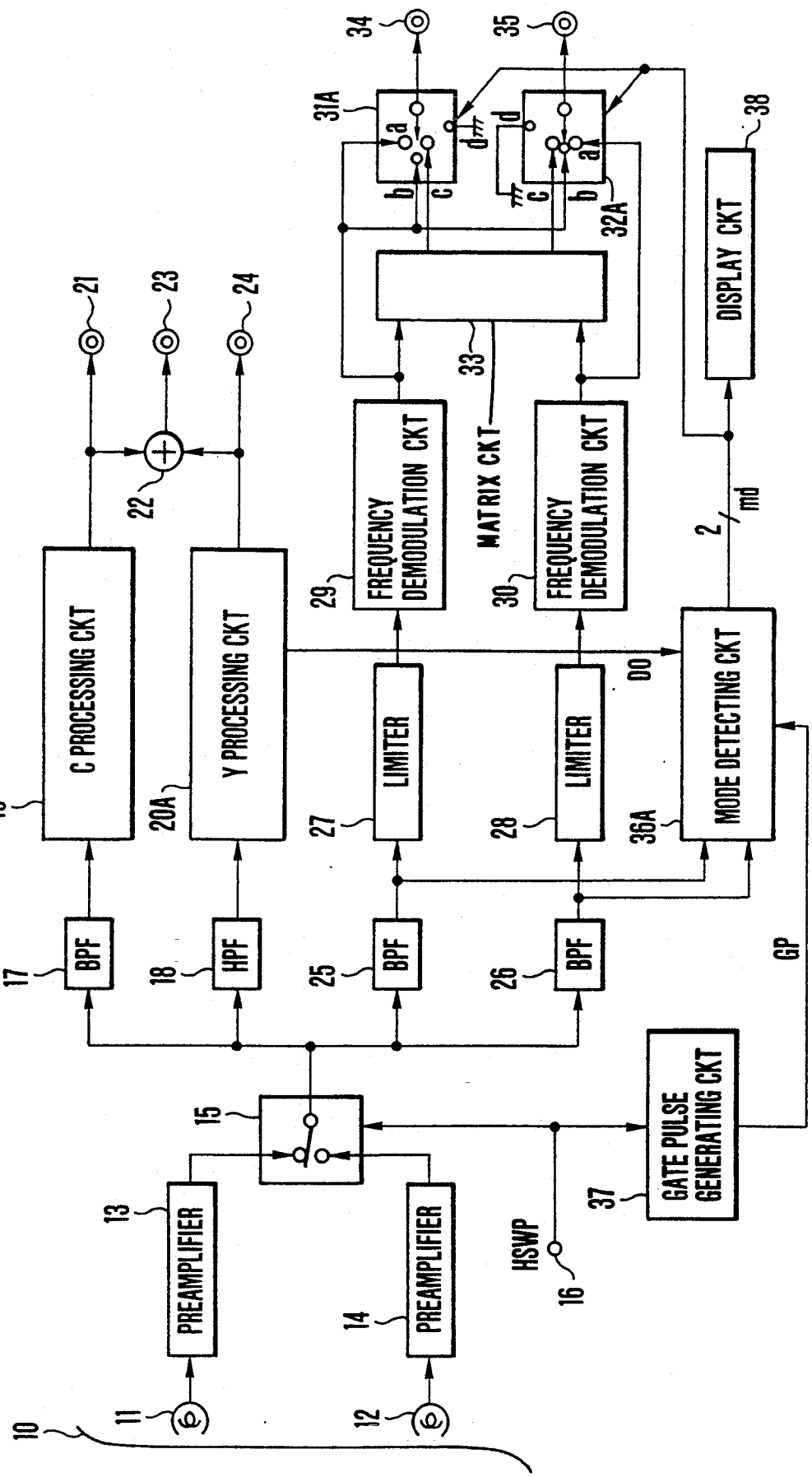
FIG. 6 is a block diagram showing in outline the arrangement of the reproducing system of a VTR which is also arranged according to this invention as another embodiment thereof.

FIG. 6 shows in outline the arrangement of the reproducing system of a VTR which is arranged as another embodiment of this invention. In FIG. 6, the same component parts as those of FIG. 3 are indicated by the same reference numerals. In the case of FIG. 6, switches 31A and 32A have terminals "a", "b", "c" and "d" respectively. Audio signals are not supplied to the output terminals 34 and 35 when the switches 31A and 32A are connected to their terminals "d". A gate pulse generating circuit 37 is arranged to generate a gate pulse signal GP in synchronism with a signal HSWP. The gate pulse signal is supplied to a mode detecting circuit 36A. A luminance signal (Y) processing circuit 20A is arranged to perform basically the same function as the signal Y processing circuit 20 of FIG. 3. However, in addition to that, the signal Y processing circuit 20A includes a known drop-out compensating circuit and is arranged to supply a drop-out detection signal DO to the mode detecting circuit 36A.

Figure 7:
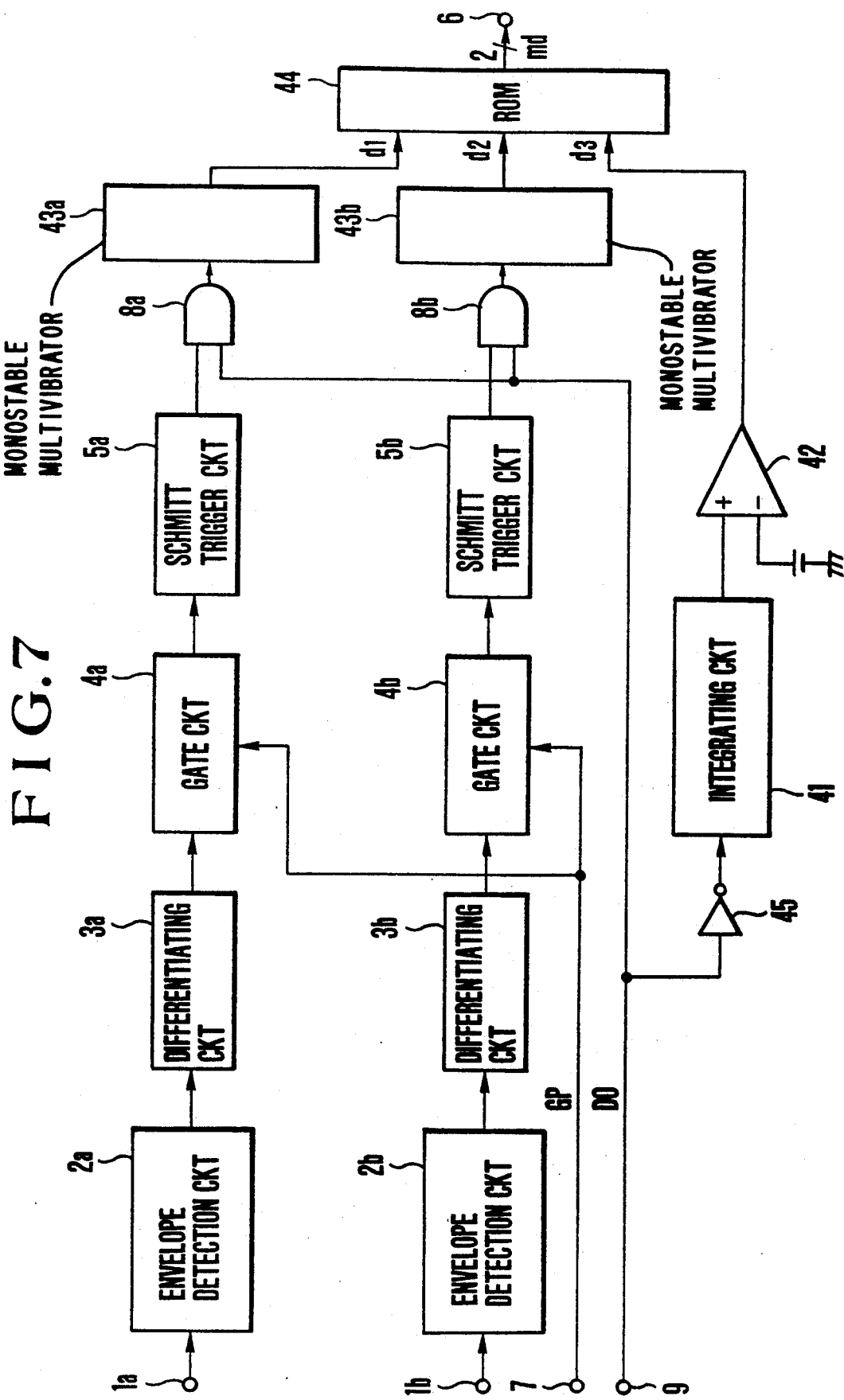
FIG. 7 is a block diagram showing by way of example the arrangement of a mode detecting circuit included in the VTR of FIG. 6.

The details of the mode detecting circuit 36A of FIG. 6 are as described below with reference to FIG. 7:

Referring to FIG. 7, terminals 1a and 1b are arranged to receive AFM signals separated by the BPFs 25 and 26 of FIG. 6. These AFM signals are respectively supplied to envelope detection circuits 2a and 2b. The envelope detection circuits 2a and 2b detect the carrier level of the AFM signals. The outputs of the envelope detection circuits 2a and 2b are respectively supplied to differentiating circuits 3a and 3b. The outputs of the circuits 3a and 3b indicate the differential wave forms of the changes taking place in the carrier levels.

The outputs of the differentiating circuits 3a and 3b are supplied to gate circuits 4a and 4b to be gated for a given period of time including a vertical blanking period and the periods of, for example, several horizontal scanning lines immediately before and after the vertical blanking period. A gate pulse signal GP which is supplied to the gate circuits 4a and 4b is formed in synchronism with the signal HSWP by the gate pulse generating circuit 37 of FIG. 6. The gate pulse signal GP comes to the mode detecting circuit 36A via a terminal 7 shown in FIG. 7. This arrangement enables each of the circuits 4a and 4b to pass only the differential wave form which is obtained when the carrier level of the AFM signal of the vertical blanking period is higher than that of other periods. Therefore, all the adverse effects of noises and drop-outs occurring during periods other than the specific period can be eliminated by this arrangement.

The differential wave forms processed through the gate circuits 4a and 4b are supplied to Schmitt trigger circuits 5a and 5b. The Schmitt trigger circuits 5a and 5b are arranged to be insensitive to all inputs that are below a given threshold value. They are insensitive to any differential wave form below an amplitude degree corresponding to the change-over of the carrier level effected at the time of recording. The Schmitt trigger circuits 5a and 5b thus serve to lessen also the adverse effect of any noise of the specific period gated by the gate circuits 4a and 4b.

Further, it is possible to detect only a positive differential wave form or a negative differential wave form by selectively setting the threshold level value at a positive value or at a negative value. In other words, the circuit 36A can be arranged to detect only the rise or fall of the frequency modulation carrier level by setting the threshold value for the Schmitt trigger circuits 5a and 5b either at a positive value or at a negative value. In the case of this example, the threshold value is set at a negative value. Therefore, the fall of the carrier wave level after the vertical blanking period is detected by each of the Schmitt trigger circuits 5a and 5b. The output level of the Schmitt trigger circuits 5a and 5b thus becomes high upon detection of the fall of the carrier level.

The output of each of the Schmitt trigger circuits 5a and 5b is supplied to one terminal of an AND gate 8a or 8b. To the other terminal of the AND gate 8a or 8b is supplied via a terminal 9 the above-stated drop-out detection signal DO from the signal Y processing circuit 20A. The level of the drop-out detection signal DO becomes a logical low level when a drop-out takes place. In the event of drop-out, the outputs of the Schmitt trigger circuits 5a and 5b are nullified by the AND gates 8a and 8b.

The outputs of the AND gates 8a and 8b are supplied to retriggerable monostable multivibrators 43a and 43b. The time constant of the monostable multivibrators 43a and 43b is set in such a manner that they are held in their high level states for the period of several fields after triggering. The reason for this is as follows: In a case where no main-and-sub audio signals are recorded, there is little possibility that any pulses are output from the AND gates 8a and 8b because of the actions of the gate circuits 4a and 4b and the AND gates 8a and 8b. However, it is possible that occurrence of a drop-out might cause no pulse to be output during the vertical blanking period although the main-and-sub audio signals are recorded. In other words, it is not possible to determine that the main-and-sub audio signals are not recorded on the basis of the fact that no pulse is output from the AND gates 8a and 8b for a period of only two or three fields. The monostable multivibrators 43a and 43b are provided for the purpose of avoiding such faulty detection.

An integrating circuit 41 is arranged to receive a signal which is obtained by inverting the above-stated drop-out detection signal DO by an inverter 45. When the output of the integrating circuit 41 comes to exceed a given level, a comparator 42 produces its output at a high level. The outputs of the monostable multivibrators 43a and 43b and the output of the comparator 42 are used as reading addresses for reading from a read-only memory (ROM) 44. The ROM 44 stores two-bit data at each of its addresses. The data is as shown in Table 1 below:

TABLE 1

| d1 | d2 | d3 | md | terminal |
| --- | --- | --- | --- | --- |
| 0 | 0 | 0 | 10 | c |
| 0 | 0 | 1 | 00 | d |
| 0 | 1 | 0 | 01 | b |
| 0 | 1 | 1 | 00 | d |
| 1 | 0 | 0 | 01 | b |
| 1 | 0 | 1 | 00 | d |
| 1 | 1 | 0 | 11 | a |
| 1 | 1 | 1 | 00 | d |

Referring to Table 1 above, "0" corresponds to a logical low level (Lo) and "1" to a logical high level (Hi). Mode data "md" is arranged to be output from the ROM 40 via an output terminal 6. The mode data "md" from the ROM 40 is used for control over the switches 31A and 32A. When the mode data "md" is "00", the switches 31A and 32A are connected to their terminals "d" as shown also in Table 1. When the mode data "md" is "01","10" and "11", the switches 31A and 32A are connected to their terminals "b","c" and "a" respectively.

A concept relative to the mode data "md" is as follows: When the output d3 of the comparator 42 is at a high level, the frequency of drop-out occurrence is too high for adequate audio signal reproduction. Therefore, even if the outputs d1 and d2 of both the monostable multivibrators 43a and 43b are at high levels, the switches 31A and 32A are connected to their terminals "d" to inhibit the audio signals from being output.

Next, in a case where the output d3 of the comparator 42 is at a low level, the mode detecting circuit operates as follows: In this case, if the outputs d1 and d2 of the monostable multivibrators 43a and 43b are equal to each other, the reliability of the information is very high. Therefore, if the levels of both the outputs d1 and d2 are high, the switches 31A and 32A are connected to their terminals "a" to allow the main-and-sub audio signals which have been processed by the frequency demodulation circuits 29 and 30 to be output from the terminals 34 and 35 respectively. Further, if both the outputs d1 and d2 are at low levels, the switches 31A and 32A are connected to their terminals "c". As a result, the stereophonic audio signals of the left and right channels which are output from the matrix circuit 33 are output from the terminals 34 and 35. However, in a case where the outputs d1 and d2 are not equal to each other, the reliability of information is low. Under such a condition, there is probability of faulty processing actions for both the main-and-sub audio signal recording mode and the stereophonic signal recording mode. Such faulty processing actions would result in unacceptable sounds. In view of this, in the case of this example, if the outputs d1 and d2 are not equal to each other, the output of the frequency demodulation circuit 29 which is either the sum signal of stereophonic audio signals or the main audio signal of the main-and-sub audio signals is supplied to the output terminals 34 and 35.

In this instance, the display part 38 makes a display according to the mode information of two bits, like the preceding example, indicating whether the output audio signals are stereophonic audio signals or monaural audio signals or main-and-sub audio signals.

The arrangement described enables the mode detecting circuit to make a fairly accurate discrimination between the record of the stereophonic audio signals and that of the main-and-sub audio signals. It is another advantage of the arrangement that identifying information is recordable by just raising the level of the frequency modulation carrier wave for the vertical blanking period and that the above-stated discrimination can be made at the time of reproduction by just detecting a change taking place in the carrier level. The identifying information can be recorded and detected, at the time of reproduction, without necessitating any additional recording and reproducing means.

Further, in the case of embodiment shown in FIGS. 6 and 7, the frequency modulation carrier level is arranged to be higher in the vertical blanking period than in other periods in recording the audio signals in the main-and-sub audio signal recording mode. However, this arrangement may be changed to record the frequency modulation carrier wave at a higher level in recording audio signals in the stereophonic audio signal recording mode and to detect thereby the stereophonic audio signals at the time of reproduction.

Further, the arrangement shown in FIG. 7 may be changed to include an AND gate which is arranged to obtain the logical product of the drop-out detection signal and the gate pulse signal. Then, about the same advantageous effect can be attained by controlling the gate circuits 4a and 4b with the signal of this logical product without recourse to the AND gates 8a and 8b.

Figure 8:
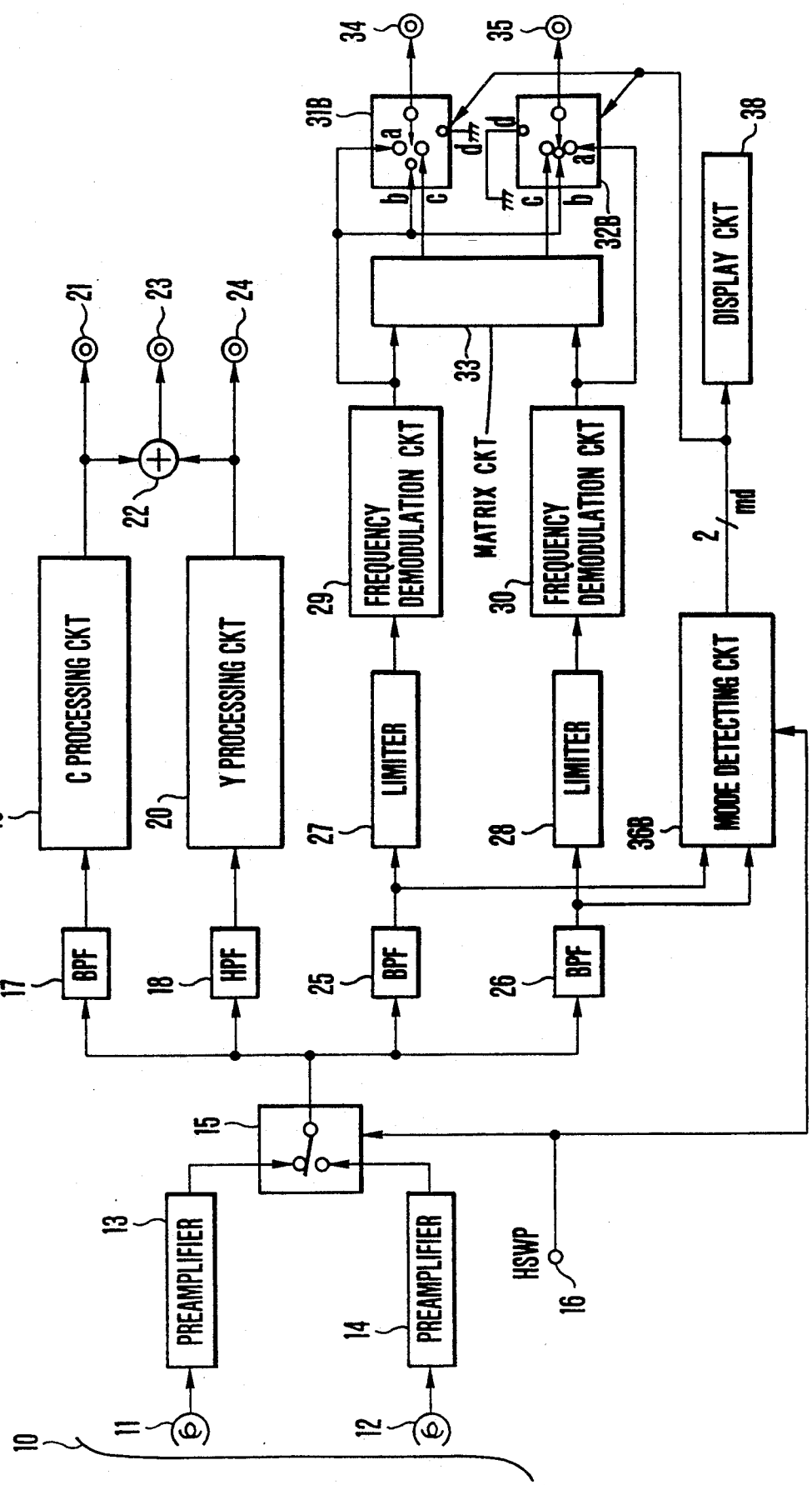
FIG. 8 is a block diagram showing in outline the arrangement of the reproducing system of a VTR which is arranged as a further embodiment of the invention.

FIG. 8 shows in outline the arrangement of the reproducing system of a VTR which is arranged as a further embodiment of this invention. In FIG. 8, the same component parts as those of FIGS. 3 and 6 are indicated by the same reference numerals and the details of them are omitted from the following description. Referring to FIG. 8, switches 31B and 32B are provided with terminals "a", "b","c" and "d" respectively. The signals output from these terminals are the same as in the case of FIG. 6.

Figure 9:
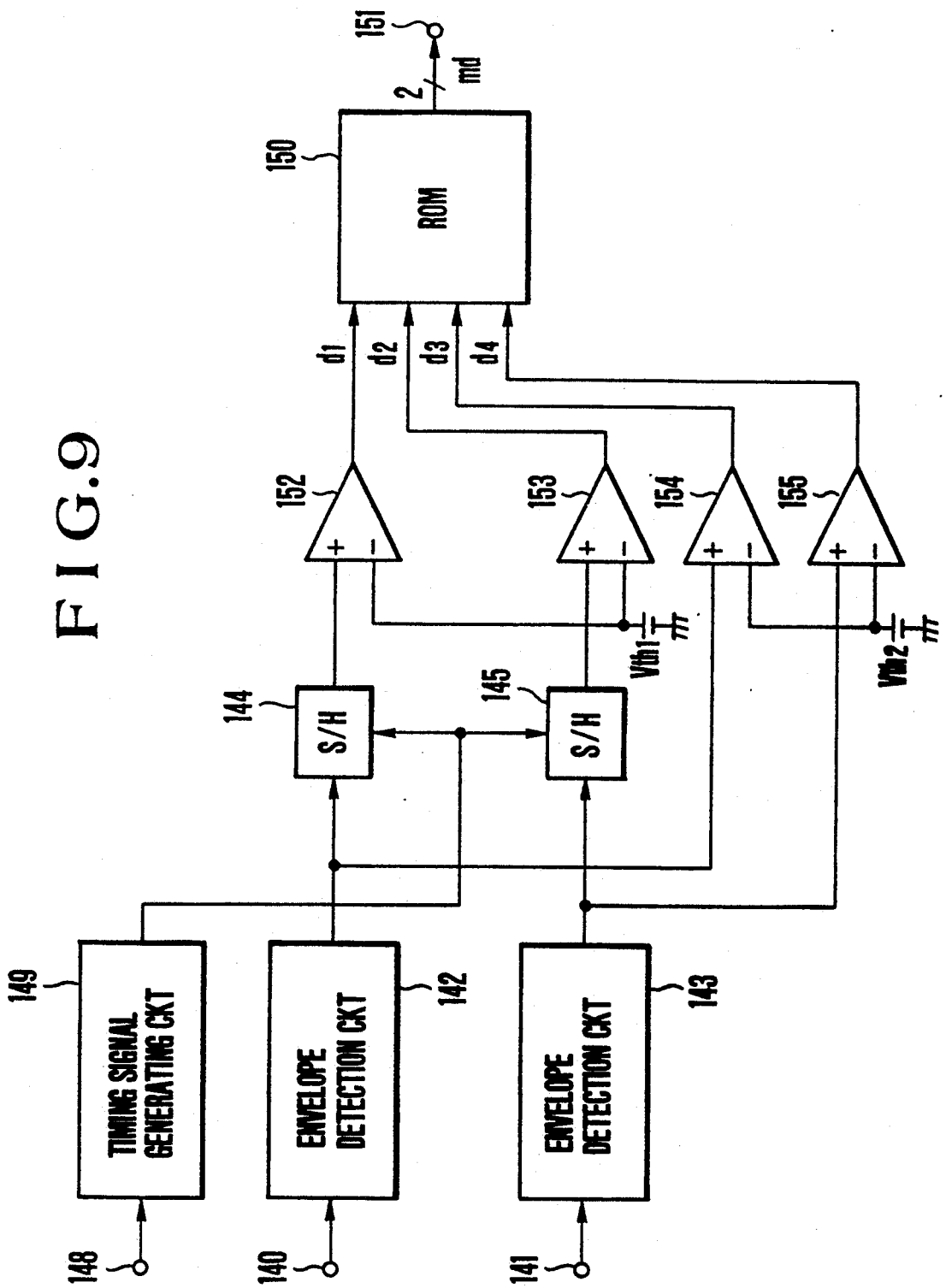
FIG. 9 is a block diagram showing by way of example the arrangement of the mode detecting circuit of the VTR of FIG. 8.

The details of a mode detecting circuit 36B which is included in FIG. 8 are as described below:

FIG. 9 shows by way of example the arrangement of the mode detecting circuit 36B of FIG. 8. Referring to FIG. 9, terminals 140 and 141 are arranged to receive AFM signals which are separated by the BPFs 25 and 26 of FIG. 8. These AFM signals are supplied to envelope detection circuits 142 and 143 respectively. The envelope detection circuits 142 and 143 are arranged to detect the levels of the carrier waves of the AFM signals. The output of the envelope detection circuit 142 is supplied to a sample-and-hold (S/H) circuit 144 and a comparator 154. The output of the envelope detection circuit 143 is supplied to an S/H circuit 145 and a comparator 155.

The S/H circuit 144 and 145 are arranged to sample and hold the carrier levels of the AFM signals obtained in the vertical blanking period respectively. Sampling pulses for this action are formed by a timing signal generating circuit 149 in synchronism with a head-switching pulse signal HSWP coming via a terminal 148. The level signal outputs of the S/H circuits 144 and 145 are respectively supplied to comparators 152 and 153. If these inputs from the S/H circuits which indicate difference levels are higher than a given threshold level value Vth1, the comparators 152 and 153 produce logical high level (Hi) signals. In other words, the output levels of the comparators 152 and 153 become high in cases where the main-and-sub audio signals are recorded.

Meanwhile, the outputs of the envelope detection circuits 142 and 143 are supplied also to the comparators 154 and 155. The comparators 154 and 155 then detect whether the carrier levels of the AFM signals are higher than a given threshold level value Vth2. If the carrier levels are found to be higher than the threshold value Vth2, i.e., if the carrier levels are sufficiently high, the output levels of the comparators 154 and 155 become high.

The outputs d1, d2, d3 and d4 of the comparators 152, 153, 154 and 155 are used as reading addresses for reading from a read-only memory (ROM) 150. In the ROM 150, there is stored two-bit data "md" at each address as shown in Table 2 below:

| d1 | d2 | d3 | d4 | md | terminal |
|----|----|----|----|----|----------|
| 0 | 0 | 0 | 0 | 00 | d |
| 0 | 0 | 0 | 1 | 00 | d |
| 0 | 0 | 1 | 0 | 01 | b |
| 0 | 0 | 1 | 1 | 10 | c |
| 0 | 1 | 0 | 0 | 00 | d |
| 0 | 1 | 0 | 1 | 00 | d |
| 0 | 1 | 1 | 0 | 01 | b |
| 0 | 1 | 1 | 1 | 01 | b |
| 1 | 0 | 0 | 0 | 00 | d |
| 1 | 0 | 0 | 1 | 00 | d |
| 1 | 0 | 1 | 0 | 01 | b |
| 1 | 0 | 1 | 1 | 01 | b |
| 1 | 1 | 0 | 0 | 00 | d |
| 1 | 1 | 0 | 1 | 00 | d |
| 1 | 1 | 1 | 0 | 01 | b |
| 1 | 1 | 1 | 1 | 11 | a |

In Table 2 above, "0" corresponds to a logical low level (Lo) and "1" to a high level (Hi). The ROM 150 is arranged to produce mode data "md" through a terminal 151. The mode data "md" is used as control data for controlling the switches 31B and 32B. When the mode data "md" is "00" as shown in Table 2, the switches 31B and 32B are connected to their terminals "d". The switches 31B and 32B are connected to their terminals "b","c" and "a" respectively when the mode data "md" is "01","10" and "11".

The concept relative to the mode data "md" is as follows: In a case where the output d3 of the comparator 154 is at a low level, this indicates the absence of any record of the sum signal of stereophonic audio signals and also that of any main audio signal. It is quite difficult to obtain any normal audio output in this case. Therefore, the switches 31B and 32B are connected to their terminals "d" to inhibit any audio output even if the levels of both the outputs d1 and d2 of the comparators 152 and 153 are high. If the output d3 is at a high level while the output d4 of the comparator 155 is at a low level, it is impossible to reproduce the audio signals of two channels. It is possible only to output monaural audio signals. In that case, therefore, the switches 31B and 32B are connected to their terminals "b" to output monaural audio signals from both the terminals 34 and 35 even if both the outputs d1 and d2 are at high levels.

In a case where the levels of both the outputs d3 and d4 are high, the embodiment operates as follows: In this instance, if the outputs d1 and d2 are equal to each other, the information carried by these outputs is highly reliable. Therefore, if the levels of both the outputs d1 and d2 are high, the switches 31B and 32B are connected to their terminals "a". Then, the main-and-sub audio signals obtained from the frequency demodulation circuits 29 and 30 are output from the terminals 34 and 35. If the levels of both the outputs d1 and d2 are low, the switches 31B and 32B are connected to their terminals "c". This causes the stereophonic audio signals of the right and left channels to be output from the terminals 34 and 35. However, if the outputs d1 and d2 are not equal to each other, the reliability of the information carried by these outputs is too low to ensure correct processing actions in both the main-and-sub audio signal recording mode and the stereophonic audio signal recording mode. If, despite of this, a faulty processing action is carried out, the audio output thus obtained would be unacceptable. In the case of this example, therefore, either the sum signal of the stereophonic audio signals or the main audio signal of the main-and-sub audio signals is output from the terminals 34 and 35 if the outputs d1 and d2 are not equal to each other. In this instance, the display part 38 makes a display, in accordance with the above-stated mode data "md" of two bits, indicating whether the audio output is stereophonic audio signals, monaural audio signals or main-and-sub audio signals.

In accordance with the arrangement described above, a monaural audio signal is output if it is impossible to make a discrimination between the record of the stereophonic audio signal recording mode and that of the main-and-sub audio signal recording mode. Further, with the main-and-sub audio signals determined to be recorded on the basis of the carrier level obtained in the vertical blanking period, a monaural audio signal is also output if the carrier level is not sufficiently high. This arrangement, therefore, effectively prevents any disagreeable noises from being output.

Further, the embodiment described is arranged, like other embodiments described in the foregoing, on the assumption that the frequency modulation carrier level is arranged to be high in the vertical blanking period in recording audio signals in the main-and-sub signal recording mode. However, this arrangement may be changed to make the frequency modulation carrier level higher in recording audio signals in the stereophonic audio signal recording mode, instead of the main-and-sub audio signal recording mode, and to permit detection of the record of the stereophonic audio signals at the time of reproduction.

What is claimed is:

1. A detecting device for detecting a kind of an audio signal recorded on a recording medium, in which said audio signal is a frequency-modulated signal which has a level of its carrier in a specific period determined according to said kind of audio signal, comprising:
   (a) A reproducing head arranged to trace said recording medium;
   (b) a band-pass filter for filtering a frequency band near a frequency of said carrier to separate said frequency-modulated audio signal from a signal reproduced by said reproducing head;
   (c) a timing pulse generating circuit arranged to operate in synchronism with the tracing operation of said reproducing head to generate a first timing pulse and a second timing pulse;
   (d) a firs detecting circuit arranged to operate only during said specific period in response to said first timing pulse to detect a level of the carrier of the frequency-modulated audio signal separated by said band-pass filter;
   (e) a second detecting circuit arranged to operate at least during a period other than said specific period in response to said second timing pulse to detect a level of the carrier of the frequency-modulated signal separated by said band-pass filter;
   (f) a comparator for comparing the level detected by said first detecting circuit with the level detected by said second detecting circuit and to provide an output indicative of the comparison; and
   (g) a discrimination circuit for discriminating the kind of said audio signal in accordance with said output of said comparator.

2. A device according to claim 1, wherein said discrimination include a comparing circuit for comparing said output of said comparator with a predetermined level.

3. A device according to claim 1, wherein said first detecting circuit and said second detecting circuit include respective sampling circuits which operate in response to said first timing pulse and said second timing pulse, respectively.

4. A device according to claim 1, wherein said reproducing head is a rotary head and wherein said timing pulse generating circuit is arranged to generate said first and second timing pulses depending upon a phase of rotation of said rotary head.

5. A detecting device for detecting a kind of an audio signal recorded on a recording medium, in which said audio signal is a frequency-modulated signal which has a level of its carrier in a specific period determined according to said kind of audio signal, comprising:
   (a) a reproducing head arranged to trace said recording medium;
   (b) a band-pass filter for filtering a frequency band near a frequency of said carrier to separate said frequency-modulated audio signal from a signal reproduced by said reproducing head;
   (c) a timing pulse generating circuit arranged to operate in synchronism with the tracing operation of said reproducing head to generate a first timing pulse and a second timing pulse;
   (d) a detecting circuit arranged to operate at least partially in said a specific period in response to said first timing pulse to generate a detection signal having a level relating to a difference between carrier levels of the frequency-modulate audio signal separated by said band-pass filter in said specific period and a period other than said specific period;
   (e) a latch circuit arranged to operate in response to said second timing pulse to latch the detection signal output from said detecting circuit; and
   (f) a discrimination circuit for discriminating the kind of said audio signal in accordance with the output of said latch circuit.

6. A device according to claim 5, wherein said latch circuit includes a D flip-flop.

7. A device according to claim 5, wherein said reproducing head is a rotary head and wherein said timing pulse generating circuit is arranged to generate said first and second timing poses in accordance with a phase of rotation of said rotary head.

* * * * *

UNITED STATES PATENT AND TRADEMARK OFFICE
CERTIFICATE OF CORRECTION

PATENT NO. : 5,233,484
DATED : August 3, 1993
INVENTOR(S) : Kenichi Nagasawa, et. al.

It is certified that error appears in the above-indentified patent and that said Letters Patent is hereby corrected as shown below:

```
Column 1, line 6, delete "of" (second occurrence).
Column 1, line 44, delete "the"--.
Column 2, line 17, after "portion" insert --of --.
Column 3, line 34, after "as" insert --a --.
Column 3, line 35, delete "a"--.
Column 3, line 64 change "made" to -- mode--.
Column 4, line 19, change "(HpF)' to -- (HPF) --.
Column 5, line 35, after "of" insert -- the --.
Column 7, line 57, delete "the"--.
Column 10, line 59, after "of" insert -- the--.
Column 12, line 60, delete "of"--.
Column 13, line 44, change "firs" to -- first --.
Column 14, line 7, change "include" to -- includes --.
Column 14, line 36, delete "a" --.
Column 14, line 39, change "modulate" to -- modulated --.
Column 14, line 54, change "poses" to -- pulses --.
```

Signed and Sealed this

Seventh Day of June, 1994

Attest:

BRUCE LEHMAN

*Attesting Officer*          Commissioner of Patents and Trademarks